United States Patent [19]

Schmitt et al.

[11] Patent Number: 5,752,321
[45] Date of Patent: May 19, 1998

[54] HEADLAMP POSITION INDICATOR DEVICE

[75] Inventors: Karl R. Schmitt; Gary Eugene Hendricks, both of Rockford, Ill.

[73] Assignee: Textron Inc., Providence, R.I.

[21] Appl. No.: 646,498

[22] Filed: May 8, 1996

[51] Int. Cl.$^6$ ........................................ G01C 9/28
[52] U.S. Cl. .................. 33/335; 33/288; 33/264; 362/66
[58] Field of Search .............. 33/335, 288, 264, 33/370, 384; 362/66, 80, 101, 61, 287, 418, 427

[56] References Cited

U.S. PATENT DOCUMENTS

| | | | |
|---|---|---|---|
| 5,111,369 | 5/1992 | Shirai et al. | 33/335 |
| 5,140,503 | 8/1992 | Lisak | 362/61 |
| 5,151,849 | 9/1992 | Nagengast et al. | 33/335 |
| 5,253,154 | 10/1993 | McMahan et al. | 33/335 |
| 5,317,486 | 5/1994 | Schmitt | 362/66 |
| 5,506,759 | 4/1996 | Shirai et al. | 33/288 |

*Primary Examiner*—Christopher W. Fulton
*Attorney, Agent, or Firm*—Trexler, Bushnell, Giangiorgi & Blackstone, Ltd.

[57] ABSTRACT

A headlamp position indicator device is used to visually indicate the "zero position" of a headlamp in a headlamp arrangement. The headlamp arrangement generally includes a movable reflector mounted in a stationary component. The device includes a metal spring clip having a bubble level assembly mounted thereon. The clip is attached to a pocket formed on the reflector at an attachment point. An adjusting screw is provided on the device, and when engaged against a surface of the reflector, causes flexure of the clip proximate to the attachment point to adjust the position of the device relative thereto. Specifically, flexure of the clip occurs between the attachment point and the point where the bubble level assembly is affixed to the clip. To adjust the position of the device relative to the reflector after the headlamp has been adjusted to the desired zero position, the adjusting screw is rotated to cause the bubble level assembly and base portion of the spring clip to move along the length of the adjusting screw until an air bubble in the bubble level assembly is centered. Once centered, the zero position of the headlamp is indicated. If the headlamp becomes misaligned, it is easily returned to its zero position by adjustments using the adjustor mechanism. When the air bubble becomes re-centered, the headlamp has been reset to its zero position.

16 Claims, 3 Drawing Sheets

HEADLAMP POSITION INDICATOR DEVICE

BACKGROUND OF THE INVENTION

This invention is generally directed to a novel headlamp position indicator device for visually indicating to a vehicle mechanic when a headlamp in a headlamp arrangement on an automobile or the like is in its correct aiming position, commonly referred to as its "zero" position. More particularly, the invention contemplates an inexpensive headlamp position indicator device which is formed from a bubble level assembly mounted on a spring clip which is used to indicate to a vehicle mechanic when the headlamp is in its zero position. More specifically, the adjustor mechanism for the headlamp is operated to properly aim the headlamp. Thereafter, the bubble level assembly is operated to a level or "zero position", as such if the headlamp should vibrate out of position or move for any other reason, the bubble level assembly provides an indication of this fact and by adjusting the headlamp until the bubble level assembly returns to the zero position, will properly reposition the headlamp in its desired orientation.

A variety of devices are commonly used to indicate to a vehicle mechanic when a headlamp is in its zero position. Such a device may be provided as part of the headlamp adjustor mechanism which is used to adjust the aiming of the movable component in the headlamp arrangement. Other such devices are provided as separate components from the headlamp adjustor mechanism and are instead mounted directly on the movable reflector component itself to indicate to a vehicle mechanic the zero position of the movable reflector component.

Following assembly of an automobile, the headlamps must be set to their desired or zero position. This is generally accomplished by use of sophisticated photometric metering equipment and manually adjusting the headlamps until the headlamps point in the desired location by using the adjustor mechanism. Adjustor mechanisms for adjusting the aiming of a reflector component to a desired location are well-known in the art.

Due to vibration or an accident, the headlamps may move out of the desired aiming location. With certain prior art headlamp arrangements, there is no easy way to attain the desired initial position or alignment without use of specialized equipment. With the novel headlamp position indicator device of the present invention, the zero position of the movable reflector component is indicated and the vehicle mechanic need only adjust the position of the reflector component by using the adjustor mechanism to move the reflector component back to its zero position, which will be indicated by the novel headlamp position indicator device of the present invention.

OBJECTS AND SUMMARY OF THE INVENTION

A general object of the present invention is to provide a novel, inexpensive headlamp position indicator device for visually and accurately indicating to a vehicle mechanic when a movable reflector component in a headlamp arrangement is in the zero position.

An object of the present invention is to provide a headlamp position indicator device that provides a visual indication of when the movable reflector component has been moved into its zero position thereby allowing for ease of adjusting the position and for the accurate adjustment of a reflector component to its zero position.

Another object of the present invention is to provide an inexpensive headlamp position indicator device which is formed from a bubble level assembly positioned on a spring clip which is mounted on the movable component of the headlamp arrangement to indicate to a vehicle mechanic when the headlamp is in its zero position.

Briefly, and in accordance with the foregoing, the present invention discloses a novel headlamp position indicator device for use in visually indicating the correct aiming position or "zero position" of a headlamp in a headlamp arrangement. Generally, the headlamp arrangement includes a movable reflector component and a stationary component which houses the movable reflector component therein. The position of the movable component can be adjusted relative to the stationary component by use of an adjustor mechanism as is known in the art.

The headlamp position indicator device of the present invention includes a spring clip having a bubble level assembly mounted thereon. The spring clip is attached to a pocket provided on the reflector component. An adjusting screw is provided in association with the headlamp position indicator device, and when engaged against a surface of the reflector component, the adjusting screw causes flexure of the spring clip proximate to the point of attachment of the spring clip to the reflector component to adjust the position of the headlamp position indicator device relative to the reflector component. Specifically, flexure of the spring clip occurs between the point of attachment of the spring clip to the reflector component and the point where the bubble level assembly is affixed to the base portion. The adjusting screw member may be carried solely by the bubble level assembly or may be carried by the base portion and the bubble level assembly.

The spring clip is formed of metal and includes an elongated base portion. The attachment structure is integrally formed on a forward end of the base portion.

The attachment structure is formed from at least one tine. The tine is a one-way tine such that when it is engaged within the pocket, it cannot be easily removed therefrom. Preferably, the tine extends from a top portion of the attachment structure and engages the top wall of the pocket to initially bias the base portion downwardly from a horizontal position, approximately two degrees.

The bubble level assembly is mounted on the base portion of the spring clip and provides rigidity to that portion of the spring clip to which the assembly is mounted so as to prevent flexure of that portion of the base portion during adjustments as described herein. The bubble level assembly includes a holder and a glass vial mounted in the holder for holding a liquid. An air bubble is formed in the liquid. The vial has markings thereon for denoting the position of the air bubble with respect to the vial. Alternatively, the separate vial can be eliminated and the liquid and air bubble can be housed in the holder which has a clear cover thereover.

The spring clip may further include an extension portion which extends downwardly from a rear end of the base portion. The extension portion is at approximately a right angle relative to the base portion and is integrally formed with the base portion. The extension portion includes an elongated slot therethrough. A set screw member is provided and is engaged through the elongated slot and with the reflector component to prevent movement of the base portion once the desired position of the headlamp position indicator device is attained.

To adjust the position of the headlamp position indicator device relative to the reflector component after the reflector component has been adjusted to the desired zero position, the adjusting screw is turned. The end of the adjusting screw extends through an opening in the spring clip and engages the surface of the reflector component. Since the adjusting screw is threadedly engaged with the holder or housing for the bubble level, operation of the adjusting screw causes the holder and spring clip to move upwardly or downwardly along the length of the adjusting screw until the air bubble is centered in the vial. During this adjustment, flexure of the spring clip occurs between the point of attachment of the base portion to the reflector component and the point where the bubble level assembly is affixed to the base portion. Once the air bubble is centered in the vial, the zero position of the headlamp is indicated and the headlamp position indicator device is not adjusted again. If an extension portion and a set screw are provided, the set screw is loose during the rotation of the adjusting screw such that it easily slides within the elongated slot, and once the air bubble is centered, the set screw is tightened to prevent further movement of the headlamp position indicator device along the adjusting screw.

If the headlamp is moved out of its zero position due to vibration or an accident, for example, the headlamp is easily returned to its zero position by a vehicle mechanic using the adjustor mechanism to alter the position of the movable reflector component. When the air bubble becomes re-centered in the vial, the vehicle mechanic knows that the zero position of the headlamp has been reset.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 1:
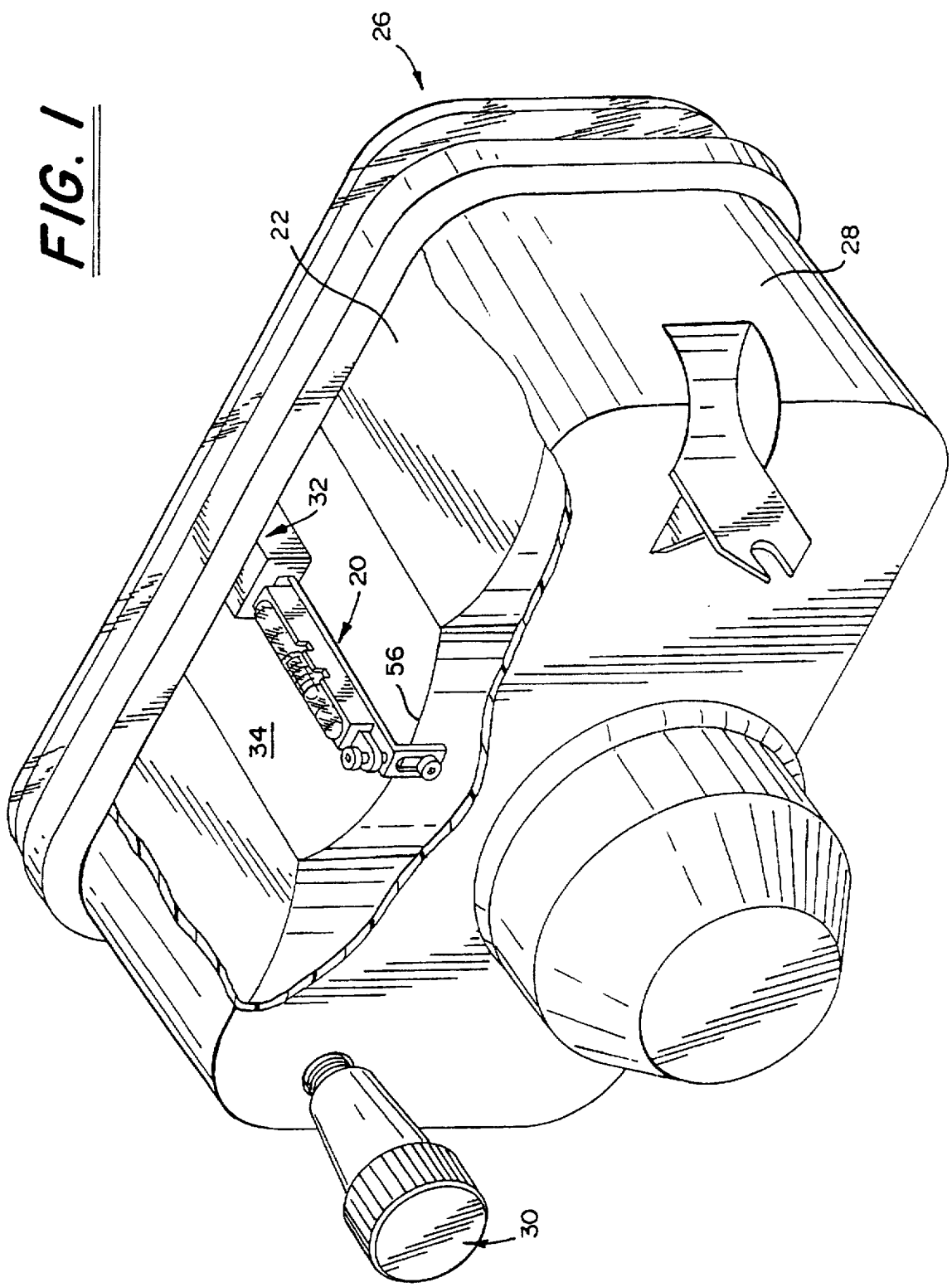
FIG. 1 is a perspective view of a novel headlamp position indicator device which includes a bubble level assembly mounted to a spring clip which incorporates the features of a first embodiment of the invention shown in its environment attached to a headlamp arrangement, wherein the headlamp position indicator device is in an uppermost position.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention discloses a headlamp position indicator device 20 for denoting the proper aiming or "zero position" of a movable reflector component 22 in a headlamp arrangement 26 so that a vehicle mechanic can easily return the headlamp to the zero position. The headlamp arrangement 26 includes a stationary component or housing 28 which houses the movable reflector component 22. The movable reflector component 22 can pivot in the vertical plane relative to the stationary component 28 by means of a headlamp adjustor mechanism 30 which pivots the reflector component 22 around a fixed pivot (not shown) on the reflector component 22 which engages the stationary component 28. A like adjustor mechanism would also be employed to move or pivot the headlamp in the horizontal plan. Headlamp adjustor mechanisms are well-known in the art and a variety of mechanisms can be used with the present invention.

The headlamp position indicator device 20 of the present invention is affixed within a pocket 32 formed on the reflector component flat top surface 34. The pocket 32 may be integrally formed on the reflector component 22 or may be provided as a separate component which is secured to the reflector component 22. The pocket 32 has a top wall 36 and opposite side walls 38a, 38b. The reflector component 22 and the pocket 32 are fabricated from a thermal setting material which has a hardness that is close to ceramic materials.

A first embodiment of the headlamp position indicator device 20 is shown in FIGS. 1–4. A second embodiment of the headlamp position indicator device 20a is shown in FIG. 5. Like elements in each embodiment are denoted with like reference numerals with the like elements in the second embodiment being denoted with the numeral having the suffix "a" thereafter.

Figure 2:
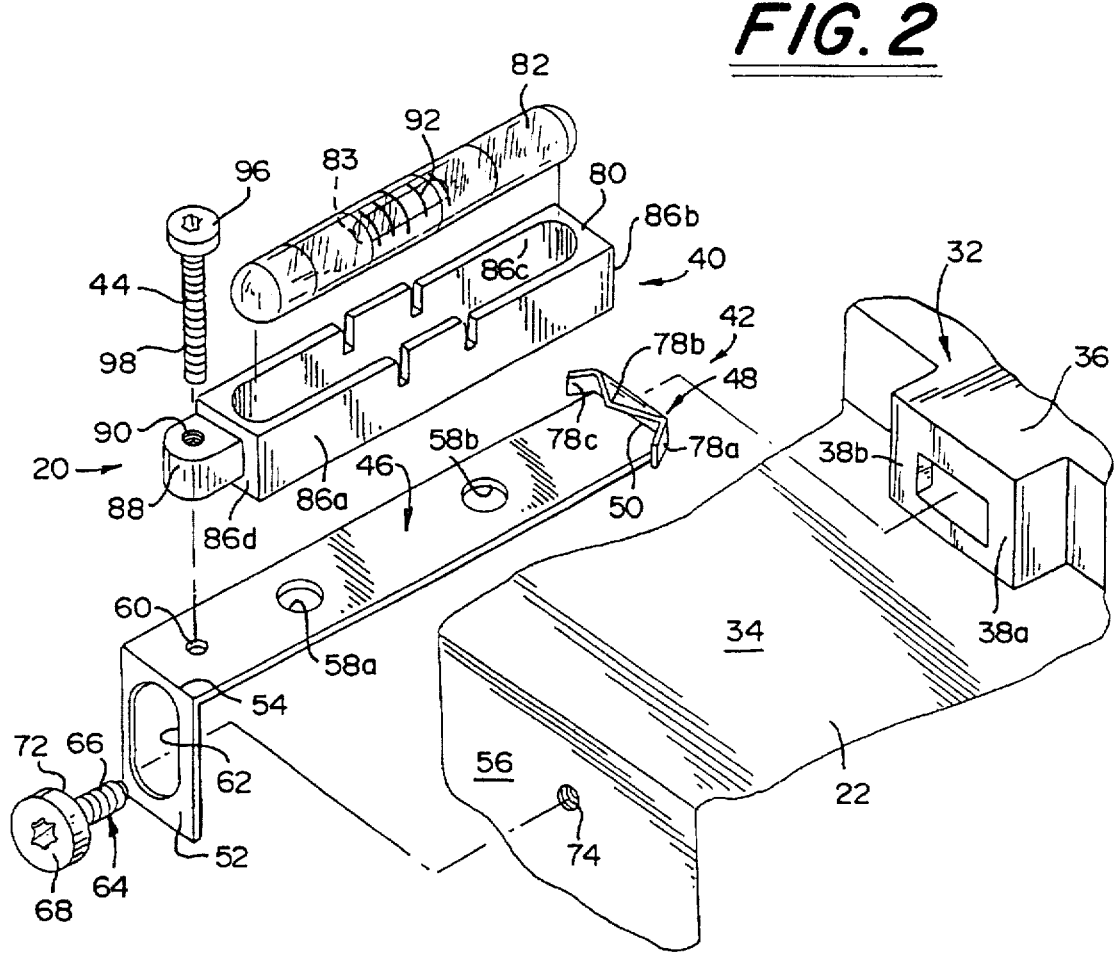
FIG. 2 is an exploded perspective view of the headlamp position indicator device shown in FIG. 1 showing a portion of the headlamp arrangement.
Figure 3:
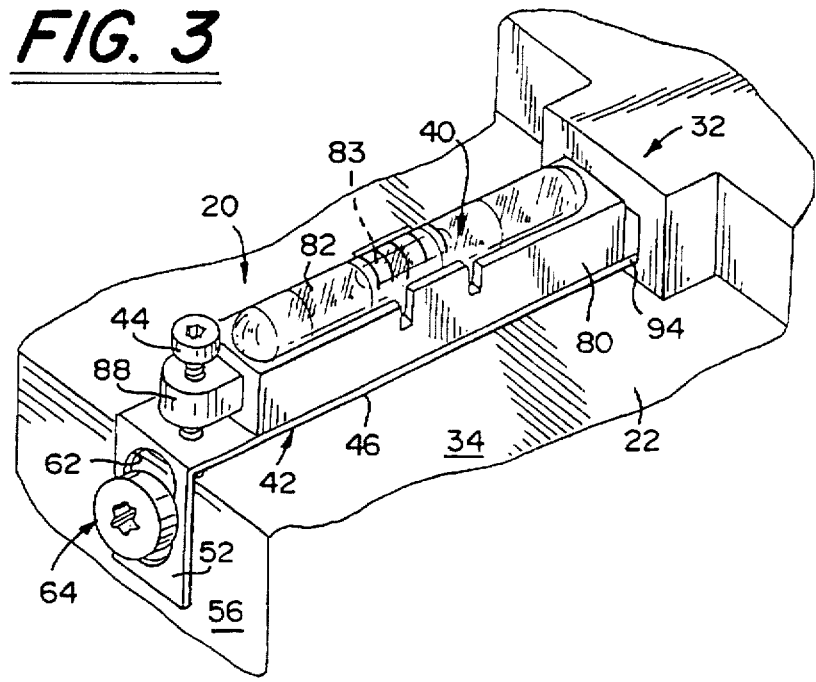
FIG. 3 is an assembled perspective view of the headlamp position indicator device shown in FIG. 1 showing a portion of the headlamp arrangement, wherein the headlamp position indicator device is in an intermediate position.

As shown in FIGS. 2 and 5, each embodiment of the headlamp position indicator device 20, 20a includes a bubble level assembly 40, 40a mounted on a spring clip 42, 42a. As shown in the first embodiment, an adjusting screw 44 is carried by the bubble level assembly 40 and spring clip 42 as described herein. As shown in FIG. 5, in the second embodiment of the headlamp position indicator device 20a, the adjusting screw 44a is carried solely by the bubble level assembly 40a, as described herein.

Directing attention to the specifics of the first embodiment of the headlamp position indicator device 20, shown in FIGS. 1–4, the spring clip 42 is formed from a base portion 46 having an attachment structure 48 integrally formed at a front end 50 thereof and an extension portion 52 integrally formed at a rear end 54 thereof. The spring clip 42 is preferably formed from sheet metal which can be flexed.

The base portion 46 of the spring clip 42 is flat and generally rectangular in shape. The base portion 46 has a length which is equal to the length of the top wall 34 of the reflector component 22 to the junction between the top wall 34 and the rear wall 56 of the reflector component 22. A pair of spaced openings 58a, 58b are formed through the base portion 46 for reasons described herein. In addition, an aperture 60 is provided proximate to the rear end 48 of the base portion 46 for reasons described herein.

The extension portion 52, which is integrally formed at the rear end 54 of the base portion 46, extends at approximately a right angle to the base portion 46. The top of the extension portion 52 starts at the rear end 54 of the base portion 46 and extends downwardly therefrom. An elongated slot 62, which receives a set screw member 64, is provided through the extension portion 52.

The set screw member 64 has a threaded shank portion 66 which extends from a head 68. The head 68 has a TORX® drive system provided thereon for rotating the set screw member 64, but may be provided with other hex drive systems. The head 68 of the set screw member 64 defines a shoulder 72 thereunder.

The set screw member 64, in addition to being engaged through the elongated slot 62 in the extension portion 52 is also engaged in a threaded aperture 74 provided in the rear wall 56 of the reflector component 22. The threaded aperture 74 is provided at a distance from the junction of the reflector component top wall 34 and the rear wall 56 which is equal to the distance between the junction between the rear end 54 of the base portion 46 and the top of the extension portion 52 and approximately the middle of the elongated slot 62.

The attachment structure 48 provided at the front end 50 of the base portion 46 is engaged within the pocket 32 formed on the reflector component 22 to rigidly fix the forward end of the spring clip 42. The attachment structure 48 substantially prevents the spring clip 42 from pivoting relative to the pocket 32, but some pivoting may occur.

The attachment structure 48 is formed from a front wall portion 76 which extends upwardly at a right angle relative to the base portion 46 at the front end 50 thereof and a plurality of struck barbs or tines 78a, 78b, 78c which extend from the front wall portion 76. The top tine 78b extends from the top of the front wall portion 76 and the opposite side tines 78a, 78c extend from the sides of the front wall portion 76. The tines 78a, 78b, 78c are angled outwardly relative to the front wall portion 76 and toward the base portion 46.

When inserted into the pocket 32, the top tine 78b bites into the interior surface of the pocket top wall 36 and the side tines 78a, 78c bite into the interior surface of the respective side walls 38a, 38b of the pocket 32. The tines 78a, 78b, 78c are one-way in that once inserted into the pocket 32, the tines 78a, 78b, 78c cannot be easily removed from their engagement with the pocket 32. Thus, the top-to-bottom interior dimension of the pocket 32 is slightly less than the dimension between the topmost point of the top tine 78b and the base portion 46 and the side-to-side interior dimension of the pocket 32 is slightly less than the dimension between the outermost points of the side tines 78a, 78c such that the tines 78a, 78b, 78c are slightly flexed inwardly when inserted into the pocket 32 and spring out to bite into the interior surfaces of the walls of the pocket 32 when fully inserted therein. Once the attachment structure 48 is inserted into the pocket 32, the mounting is relatively rigid and does not substantially pivot relative to the pocket 32.

The bubble level assembly 40 includes a plastic holder 80 having a vial 82 securely mounted therein. The vial 82 holds a liquid which has an air bubble 83 formed therein. The vial 82 is preferably formed from Pyrex or borosilicate. Pyrex is preferred because it can withstand heat more readily than other transparent materials. The liquid housed in the vial 82 is preferably mineral spirit and a green fluorescent may be added to the liquid. The vial 82 has a plurality of graduations 92, made from black two part epoxy ink or ceramic, thereon for denoting the correct positioning of the movable reflector component 22 as described herein.

The holder 80 is generally box-like in shape having a bottom wall 84 and four walls 86a, 86b, 86c, 86d which extend upwardly from the bottom wall 84. The top of the holder 80 is open for the receipt of the vial 82 therein. While the vial 82 is preferably used to house the liquid and the air bubble 83, it is anticipated that the plastic holder 82 itself could define the chamber wherein the liquid and air bubble 83 are housed and a clear cover placed thereover. The holder material is preferably glass filled nylon with elastomer.

The rearmost wall 86d of the holder 80 has a boss 88 which extends outwardly therefrom. The boss 88 is of a predetermined height has an elongated, threaded bore 90 formed therethrough, through which the adjusting screw member 44 is engaged.

Figure 4:
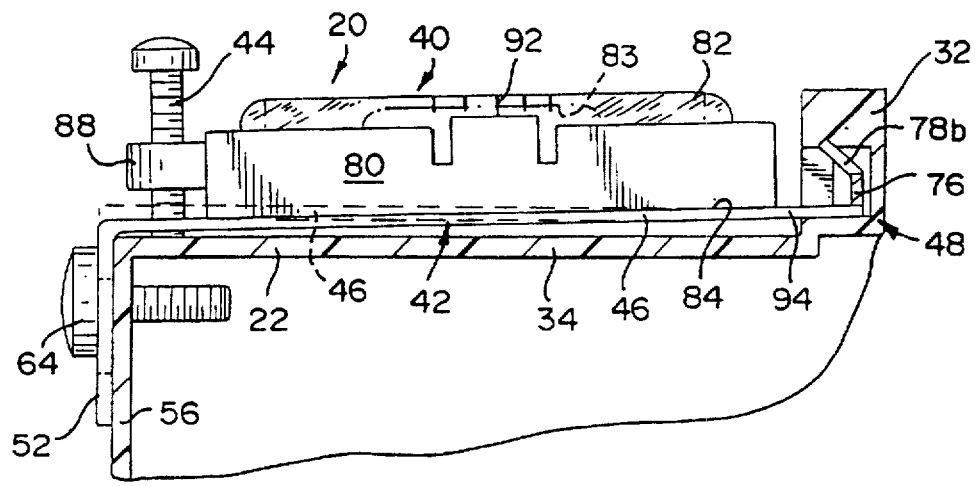
FIG. 4 is a side elevational view of the headlamp position indicator device shown in FIG. 1 showing a portion of the headlamp arrangement, wherein the headlamp position indicator device is in a bottommost position.
Figure 5:
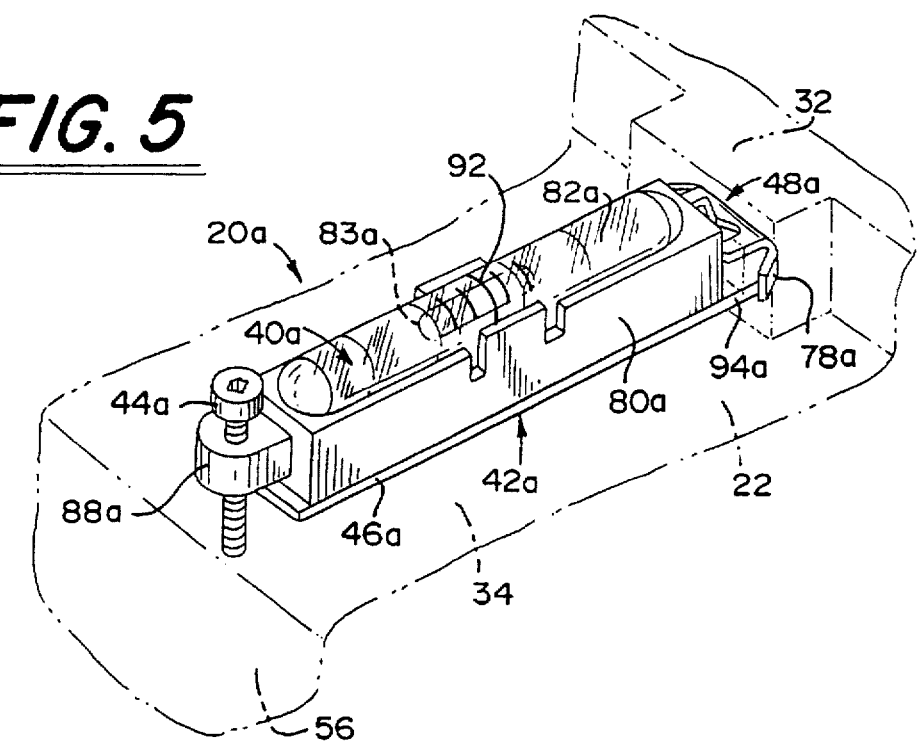
FIG. 5 is an assembled perspective view of the novel headlamp position indicator device which includes a bubble level assembly mounted to a spring clip which incorporates the features of a second embodiment of the invention showing a portion of the headlamp arrangement in phantom lines.

The holder 80 is attached to the base portion 46 of the spring clip 42 such that the forwardmost wall 86b is spaced a predetermined distance from the attachment structure 48 formed at the front end 50 of the base portion 46 to define a section 94, as best shown in FIG. 4, of the base portion 46. This section 94 has a length which is preferably approximately five millimeters in length, but may be other lengths depending on the application. The holder 80 is attached to the top surface of the base portion 46 by heat staking through the openings 58a, 58b in the base portion 46. Once the holder 80 is attached to the base portion 46, the portion of the base portion 46 to which the holder 80 is attached becomes relatively rigid as the plastic holder 80 tends to reinforce the base portion material thereunder.

The adjusting screw member 44 is formed from a head 96 having a threaded shank 98 extending therefrom. The head 96 has a TORX® drive system provided thereon for rotating the adjusting screw member 44, but may be provided with other hex drive systems. The shank 98 is engaged through the elongated, threaded bore 90 formed through the boss 88 on the holder 80 and through the aperture 60 formed through the base portion 40. The end of the shank 98 engages against the top surface of the reflector component top wall 34. Because the reflector component 22 is manufactured from a thermal setting material which is extremely hard, the adjusting screw member 44 does not dig or distort into the reflector component material as adjustments, as described herein, are made over a period of time.

Now that the specifics of the first embodiment of the headlamp position indicator device 20 have been described in detail, the method of using the headlamp position indicator device 20 will be described.

Following assembly of the automobile to which the headlamp position indicator device 20 of the present invention is to be attached, each movable reflector component 22 are set to their desired or "zero" position by using photometric metering equipment or the like and manually moving the movable reflector component 22 until the reflector beams point in the desired location by using the adjustor mechanisms 30. Once the desired zero position is attained, the movable reflector component 22 is not moved again.

The headlamp position indicator device 20 is then mounted on the reflector component 22 by engaging the tines 78a, 78b, 78c in the pocket 32. The base portion 46 extends rearwardly of the pocket 32 and the extension portion 52 extends down along the rear wall 56 of the reflector component 22. The set screw member 64 is loosely engaged through the elongated slot 62 in the extension portion 52 and engaged through the threaded aperture 74 in the rear wall 56 of the reflector component 22. Without the engagement of the adjusting screw member 44 against the top wall 34 of the reflector component 22, the top tine 78b biases the base portion 46 downwardly approximately two degrees. Thus, as shown in FIG. 4, the rearmost end of the base portion 46 rests on the top wall 34 of the reflector component 22 and the set screw member 64 is positioned all of the way at the top of the elongated slot 62.

In order to denote the zero position, the air bubble 83 in the bubble level assembly 40 must be moved to the center of the vial 82 as denoted by the graduations 92. The adjusting screw member 44 is inserted through the elongated, threaded bore 90 in the holder boss 88 and through the opening 60 in the until the lower end of 46 until the lower end of the adjusting screw member 44 engages against the top wall 34 of the reflector component 22.

To cause the air bubble 83 to move along the length of the vial 82, the angle at which the holder 80 is disposed must be changed. To change the angle, the adjusting screw member 44 is rotated which causes the boss 88 and thus, the holder 80 and spring clip 42, to translate along the length of the screw shank 98 because of the threaded engagement between the adjusting screw member 44 and the elongated, threaded bore 90 in the boss 88, and the end of the adjusting screw member 44 rotates against the top wall 34 of the reflector component 22. As the holder 80 angle is changed, the air bubble 83 moves along the length of the vial 80. Because the reflector component 22 is made from a thermal setting material that is extremely hard, there is little possibility of the adjusting screw member 44 digging into the plastic material when the adjusting screw member 44 is rotated. Turning of the adjusting screw member 44 causes the metal spring clip 42 to flex about the section 94 of the spring clip 42 intermediate the attachment structure 48 and the plastic holder 80 providing a sufficient degree of movement to permit the bubble level assembly 40 to be "zeroed out". The flexure that takes place does not occur at the attachment point of the spring clip base portion 46 to the pocket 32.

The holder 80 is moved along the adjusting screw member 44 upwardly or downwardly until the air bubble 83 is centered in the vial 82 by suitable rotation of the adjusting screw member 44 in a clockwise or counterclockwise direction. Preferably, the flexure of the section 94 of the base portion 46 is relatively minimal, approximately plus or minus two degrees from the horizontal. As the holder 80 is moved up or down along the adjusting screw member 44, the set screw member 64 slides along the length of the elongated slot 62 to provide a guide to retain the headlamp position indicator device 20 in a proper position. Once the air bubble 83 is centered in the vial 82, the set screw member 64 is tightly engaged so that the shoulder 72 sits tightly against the outer surface of the extension portion 52 of the spring clip 42.

Thereafter, if the headlight becomes misaligned, the headlight can be easily returned to its zero position. To do so, the headlamp adjustor 30 is used to move the movable reflector component 22 until the air bubble 83 once again become centered in the vial 82. The angle of the headlamp position indicator device 20 relative to the movable reflector component 30 is not changed. Once the bubble 83 is re-centered, the headlamp will be returned to its zero position.

Attention is now directed to the second embodiment of the headlamp position indicator device 20a as shown in FIG. 5. The headlamp position indicator device 20a is identical in structure to that of the first embodiment of the headlamp position indicator device 20 except for the differences discussed herein. Therefore, a repetition of the description is not set forth. The like elements are labeled in the drawings with like reference numerals having the suffix "a" thereafter.

In the second embodiment of the headlamp position indicator device 20a, the spring clip extension portion and set screw have been eliminated. Instead, the base portion 46a of the spring clip 42a ends proximate to the rear wall 86d of the box-like plastic holder 80a and does not extend beneath the adjusting screw member 44a. Thus, the adjusting screw member 44 only extends through the elongated, threaded bore 90a in the boss 88a.

When the angle of the headlamp position indicator device 20a is adjusted relative to the reflector component 22, the rigid attachment of the attachment structure 48a within the pocket 32a substantially prevents side-to-side movement of the spring clip 42a relative to the reflector component 22. Flexure of section 94a permits the changing of the position of the remainder of the spring clip 42a and the bubble level assembly 40 as described hereinabove.

Several modifications may be made to these embodiments. For example, a slight reverse bend may be provided at the rearward end of the spring clip base portion 46, 46a which would aid the degree of flexure in section 94, 94a. The front end of the spring clip 42, 42a may have a reverse bend configuration which would clip onto a portion of the reflector component 22.

Additionally, a slot could be formed in the plastic reflector component material with a tine, bar or projection being struck out of the forward portion of the spring clip base portion as an alternate to the slot shown in the drawings. The bar would fit into the slot in the plastic reflector component and would ride in the slot to provide the required degree of movement, while maintaining proper positioning of the spring clip base portion. This, however, is not as secure a mounting arrangement as is the screw head which substantially prevents longitudinal motion of the spring clip base portion out of the pocket. Another possible alternative is a boss struck from the plastic reflector component material which is engaged in the slot and overlaps to prevent the longitudinal movement.

While preferred embodiments of the present invention are shown and described, it is envisioned that those skilled in the art may devise various modifications of the present invention without departing from the spirit and scope of the appended claims.

The invention claimed is:

1. A headlamp position indicator device for use in indicating correct aiming of a headlamp in a headlamp arrangement, said headlamp arrangement being of the type generally including a movable reflector component, a stationary component for housing said movable reflector component, said headlamp position indicator device comprising: a spring clip having a base portion; a bubble level assembly mounted on said base portion; attachment structure provided on a forward end of said base portion for fixing said forward end of said base portion to the reflector component such that the remainder of said base portion is movable relative the reflector component; and an adjusting screw member associated with said headlamp position indicator device, which, when engaged against a surface of the reflector component, will produce flexure of said base portion between the point of attachment of said base portion to the reflector component and the point where said bubble level assembly is affixed to said base portion, proximate to said point of attachment of said base portion to the reflector component to position said spring clip and said bubble level assembly mounted thereon in a desired position relative to the reflector component; and further including structure for maintaining said spring clip and said bubble level assembly at said desired position relative to the reflector component.

2. A headlamp position indicator device as defined in claim 1, wherein said adjusting screw member is carried by said bubble level assembly and said base portion, said base portion including an aperture through which said adjusting screw member extends to engage the movable reflector component.

3. A headlamp position indicator device as defined in claim 1, wherein said adjusting screw member is carried by said bubble level assembly.

4. A headlamp position indicator device as defined in claim 1, wherein said base portion is made of metal.

5. A headlamp position indicator device as defined in claim 1, wherein said bubble level assembly comprises a holder, liquid provided in said holder, said liquid having an air bubble formed therein, markings associated with said holder for denoting positions of said air bubble with respect to said holder.

6. A headlamp position indicator device as defined in claim 5, wherein said liquid is further housed in a vial which is mounted in said holder.

7. A headlamp position indicator device for use in indicating correct aiming of a headlamp in a headlamp arrangement said headlamp arrangement being of the type generally including a movable reflector component, a stationary component for housing said movable reflector component, said headlamp position indicator device comprising: a spring clip having a base portion and an extension portion which extends downwardly from a rear end of said base portion, said extension portion being at approximately a right angle relative to said base portion and integrally formed with said base portion; a bubble level assembly mounted on said base portion; attachment structure provided on a forward end of said base portion for fixing said forward end of said base portion to the reflector component such that the remainder of said base portion is movable relative the reflector component; and an adjusting screw member associated with said headlamp position indicator device, which, when engaged against a surface of the reflector component, will produce flexure of said base portion between the point of attachment of said base portion to the reflector component and the point where said bubble level assembly is affixed to said base portion, proximate to said point of attachment of said base portion to the reflector component.

8. A headlamp position indicator device for use in indicating correct aiming of a headlamp in a headlamp arrangement, said headlamp arrangement being of the type generally including a movable reflector component, a stationary component for housing said movable reflector component, said headlamp position indicator device comprising: a spring clip having a base portion and an extension portion which extends downwardly from a rear end of said base portion, said extension portion being at approximately a right angle relative to said base portion and integrally formed with said base portion and including an elongated slot therethrough; a bubble level assembly mounted on said base portion; attachment structure provided on a forward end of said base portion for fixing said forward end of said base portion to the reflector component; an adjusting screw member associated with the headlamp position indicator device, which, when engaged against a surface of the reflector component, will produce flexure of said base portion proximate to the point of attachment of said base portion to the reflector component; and a set screw member engaged through said elongated slot in said extension portion, said set screw member engaging said extension portion and the reflector component to maintain said base portion in a desired position.

9. A headlamp position indicator device for use in indicating correct aiming of a headlamp in a headlamp arrangement, said headlamp arrangement being of the type generally including a movable reflector component, a stationary component for housing said movable reflector component, said headlamp position indicator device comprising: a spring clip having a base portion; a bubble level assembly mounted on said base portion; attachment structure provided on a forward end of said base portion and mounted within a pocket formed on the reflector component for fixing said forward end of said base portion to the reflector component such that the remainder of said base portion is movable relative the reflector component, said attachment structure comprises a reverse bend section on said forward end with at least one tine formed on said reverse bend forward end of said base portion which tine engages within the pocket when said reverse bend forward end is inserted into the pocket to deter removal of said spring clip from the pocket and to bias said base portion downwardly from a horizontal position; and an adjusting screw member associated with said headlamp position indicator device, which, when engaged against a surface of the reflector component, will produce flexure of said base portion between the point of attachment of said base portion to the reflector component and the point where said bubble level assembly is affixed to said base portion, proximate to said point of attachment of said base portion to the reflector component.

10. A headlamp position indicator device as defined in claim 9, wherein said at least one tine comprises a top tine which engages a top wall in said pocket, said top tine biasing said base portion downwardly from the horizontal position.

11. A headlamp position indicator device as defined in claim 10, wherein said base portion is biased downwardly approximately two degrees by the engagement of said top tine with said pocket.

12. In combination, a headlamp position indicator device and a headlamp arrangement, said headlamp arrangement comprising: a movable reflector component and a stationary component for housing said movable reflector component; and said headlamp position indicator device comprising: a spring clip having a base portion; a bubble level assembly mounted on said base portion; attachment structure provided on a forward end of said base portion for fixing said forward end of said base portion to said reflector component such that the remainder of said base portion is movable relative to said reflector component; and an adjusting screw member associated with said headlamp position indicator device, which, when engaged against a surface of said reflector component, will produce flexure of said base portion between the point of attachment of said base portion to said reflector component and the point where said bubble level assembly is affixed to said base portion, proximate to said point of attachment of said base portion to said reflector component.

13. The combination as defined in claim 12, wherein said adjusting screw member is carried by said bubble level assembly and said base portion, said base portion including an aperture through which said adjusting screw member extends to engage the movable reflector component.

14. The combination as defined in claim 12, wherein said adjusting screw member is carried by said bubble level assembly.

15. The combination as defined in claim 12, further including a pocket formed on said movable reflector component and wherein said attachment structure is mounted within said pocket, such that the remainder of the base portion is movable relative to said pocket.

16. In combination, a headlamp position indicator device and a headlamp arrangement, said headlamp arrangement comprising: a movable reflector component and a stationary component for housing said movable reflector component; and said headlamp position indicator device comprising: a spring clip having a base portion and an extension portion which extends downwardly from a rear end of said base portion, said extension portion being at approximately a right angle relative to said base portion and integrally formed with said base portion and including an elongated slot therethrough; a bubble level assembly mounted on said base portion; attachment structure provided on a forward end of said base portion for fixing said forward end of said base portion to said reflector component; an adjusting screw member associated with said headlamp position indicator device, which, when engaged against a surface of said reflector component, will produce flexure of said base portion proximate to the point of attachment of said base portion to said reflector component; and a set screw member engaged through said elongated slot in said extension portion, said set screw member engaging said extension portion and said reflector component to maintain said base portion in a desired position.

* * * * *

UNITED STATES PATENT AND TRADEMARK OFFICE
CERTIFICATE OF CORRECTION

PATENT NO. : 5,752,321
DATED : May 19, 1998
INVENTOR(S) : Karl R. Schmitt and Gary Eugene Hendricks It is certified that error appears in the above-indentified patent and that said Letters Patent is hereby corrected as shown below:

Column 7, Line 6 "the until the lower end of 46" should be
--the spring clip base portion 46 --

Signed and Sealed this

Tenth Day of November 1998

Attest:

BRUCE LEHMAN

*Attesting Officer*    Commissioner of Patents and Trademarks